W. J. JOHNSON.

Pump.

No. 6,649.

Reissued Sept. 21, 1875.

Witnesses
John E. Cerame
Wm. S. Brown

Inventor
William J. Johnson

BEST AVAILABLE COPY

UNITED STATES PATENT OFFICE.

WILLIAM J. JOHNSON, OF NEWTON, MASSACHUSETTS.

IMPROVEMENT IN PUMPS.

Specification forming part of Letters Patent No. 30,480, dated October 23, 1860; extended seven years; reissue No. 6,649, dated September 21, 1875; application filed August 4, 1875.

*To all whom it may concern:*

Be it known that I, W. J. JOHNSON, of Newton, in the county of Middlesex and State of Massachusetts, have invented a new and useful Improvement in Pumps, of which the following is a full, clear, and exact description, reference being had to the accompanying drawings, making part of this specification, in which—

Figure 1:
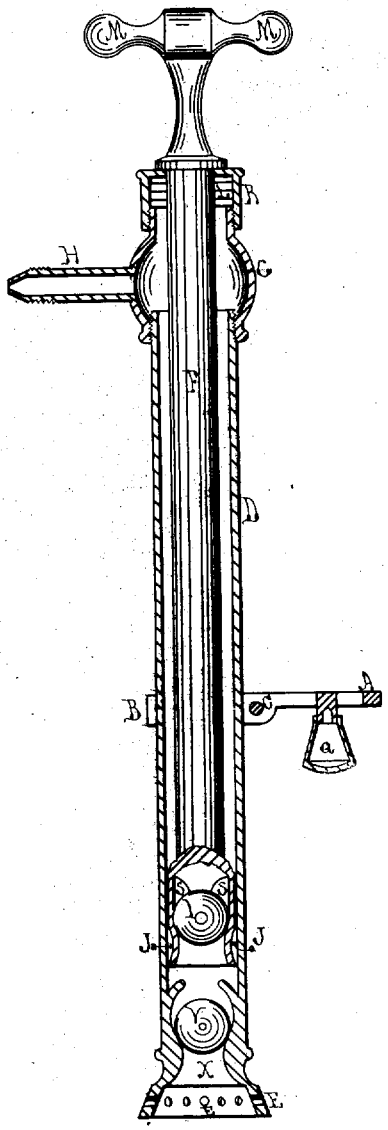
Figure 3:
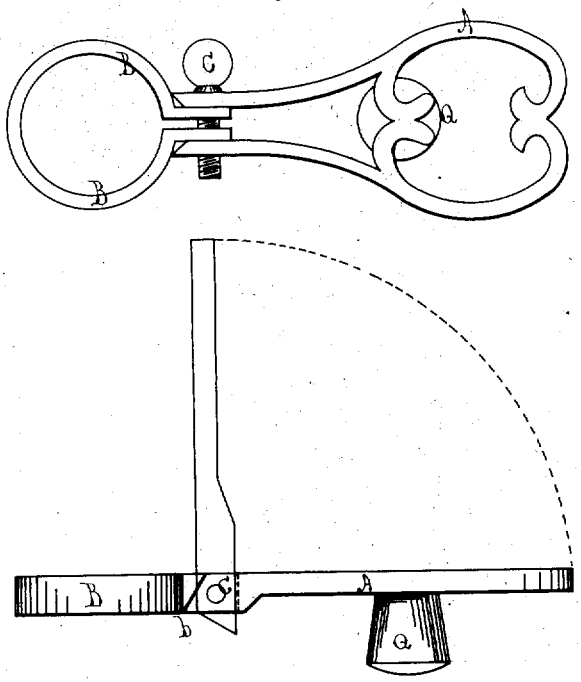
Figure 2:
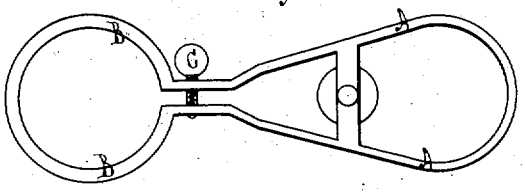

Figure 1 represents a central section of the pump; Fig. 2, a plan of a stirrup attached to the pump; and Figs. 3 and 4 represent a plan and side view of a modification of said stirrup.

This invention consists of a stirrup in combination with and arranged upon the cylinder of a pump above the suction-orifice or water-inlet, so as to be capable of holding the pump down by the foot of the operator pressing on the stirrup, substantially as described.

The cylinder D of this pump bulges out at its bottom end, as seen in Fig. 1, and it is there provided with perforations E, through which the water is sucked into the cylinder. Immediately above this portion of the cylinder a ball-valve, V, is arranged, which closes the opening X in the valve-seat, and cuts off the communication of the space of the cylinder above said ball-valve V with the orifices E, while the piston, hereinafter to be described, descends. When the piston ascends the valve V opens. A collar, G, provided with a discharge-orifice, H, to which a hose may be attached, is screwed onto the upper end of the cylinder. A cap, R, is screwed onto said collar, and packing L inserted between the cap and the top of the collar. The piston-rod F, the upper end of which is provided with suitable handles M M, works through the stuffing-box thus formed by the cap R and collar G. The piston I is hollow, and is connected to the end of the piston-rod by flanges, forming open spaces S between them. A ball playing in the cavity of the piston serves to close the piston while it ascends. The ball rises and allows the water to pass through the piston and opening S into the space between the piston-rod and cylinder while the piston descends.

The diameter of the piston-rod is made one-half of the inner diameter of the pump-cylinder, by which means half the water the cylinder holds will be discharged during the ascent, and the other half during the descent, of the piston. During the ascent of the piston the valve I closes, and consequently all the water above the piston and between the piston-rod and inner surface of the cylinder—this quantity of water being equal to one-half the capacity of the whole cylinder, as above set forth—is lifted, together with the piston, and discharged at H. During all the time of the ascent of the piston the valve V is lifted up and kept up by the water rushing through the orifices E and the seat of the valve V into the vacuum created in the cylinder by the ascent of the piston. During the descent of the piston the weight of the column of water in the cylinder closes the valve V, and the resistance of the water keeps the piston-valve I open. While the piston and piston-rod descend, the latter occupying one half of the hollow space of the cylinder, one-half of the water contained in the cylinder will be forced out at the orifice H, while the other half fills the space between the piston-rod and inner surface of the cylinder, ready to be lifted and discharged during the next ascent of the piston, as above described.

Thus it will be seen the pump is made to be double acting, and all the water the cylinder holds is discharged during one reciprocation of the piston. The operator places the pump with its bottom end into a vessel containing water and keeps it down while operating the piston by putting his foot upon a stirrup, A, fastened to the outside of the pump-cylinder.

To adapt the height of the stirrup to the height of the water-vessel, it is made adjustable in the following manner: The foot-piece A terminates into a collar, B, which embraces the cylinder, and may be slid up and down upon it. It can be secured in any desired situation by turning the clamp-screw C, and thus tightening the collar B around the cylinder. A perforated nozzle, Q, may be screwed to a little screw projecting from underneath the foot-piece, as seen in Fig. 1, and unscrewed whenever to be used.

Figs. 3 and 4 represent a modification of the stirrup, the foot-piece A being hinged to the collar B, the clamp-screw C serving as a fulcrum of the hinged foot-piece. This foot-piece can be turned up into a vertical position, as represented in full and dotted lines in Fig. 4,

BEST AVAILABLE COPY to be out of the way when the pump is to be packed or placed aside. When turned down it is prevented from descending below a horizontal line by the edge of the inclined back *b* of the foot-piece coming to rest against the collar B.

By means of an adjustable stirrup it will be seen that the lower end of the cylinder can be perforated, as at E, for water-suction, and placed in a vessel containing, or capable of containing, water, and the stirrup itself may be adjusted and fastened to any part of the cylinder above the suction-orifice or water-inlet, so as to hold the pump down by the foot of the operator pressing upon the stirrup, and the stirrup may be adjusted to the height of the water-vessel and fastened to the cylinder, so that while used with the same water-vessel, or one of the same, or nearly the same, height, to require no further adjustment, while, if stirrup is permanently attached to the bott end of the cylinder, the cylinder cannot properly placed in the water, because the c erator would then have to stand in the wat or the cylinder must be provided with an a ditional suction-tube leading into the vess containing the water, and the pump plac outside of the water-vessel.

I claim as my invention—

A stirrup, in combination with and arrang upon the cylinder of a pump above the su tion-orifice or water-inlet, substantially as d scribed.

Boston, Massachusetts, July 27, 1875.

WILLIAM J. JOHNSON.

Witnesses:

JOHN E. CRANE,
WM. S. BROWN.